United States Patent [19]

Emmerling et al.

[11] Patent Number: 5,004,794
[45] Date of Patent: Apr. 2, 1991

[54] ISOCYANATE PREPOLYMERS

[75] Inventors: Winfried Emmerling, Erkrath; Juergen Wichelhaus, Wuppertal; Tore Podola, Monheim, all of Fed. Rep. of Germany

[73] Assignee: Henkel Kommanditgesellschaft auf Aktien, Duesseldorf, Fed. Rep. of Germany

[21] Appl. No.: 128,662

[22] Filed: Dec. 4, 1987

[30] Foreign Application Priority Data

Dec. 6, 1986 [DE] Fed. Rep. of Germany ....... 3641776

[51] Int. Cl.$^5$ .............................................. C08G 18/10
[52] U.S. Cl. ....................................... 528/52; 528/58; 528/59; 528/60; 528/66; 528/67; 528/76; 528/80
[58] Field of Search ....................... 528/52, 58, 59, 60, 528/66, 67, 76, 80

[56] References Cited

U.S. PATENT DOCUMENTS

| 4,169,175 | 9/1979 | Marans et al. | 528/59 |
| 4,267,299 | 5/1981 | Oechsle, III | 528/59 |
| 4,552,934 | 11/1985 | Rabito et al. | 528/59 |

Primary Examiner—John Kight, III
Assistant Examiner—S. A. Acquah
Attorney, Agent, or Firm—Ernest G. Szoke; Wayne C. Jaeschke; Henry E. Millson, Jr.

[57] ABSTRACT

New isocyanate prepolymers obtainable from polyethers and/or polyesters containing 2 OH groups and diisocyanates and triols in a two-step process and their use as principal component in sealing compounds, adhesives and coating compositions.

18 Claims, No Drawings

ISOCYANATE PREPOLYMERS

BACKGROUND OF THE INVENTION

1. Field of the Invention

This invention relates to the production of new isocyanate prepolymers and to their use as the principal component in moisture-hardening sealing compounds, adhesives, and coating compositions.

2. Statement of Related Art

The use of NCO-terminated polyurethane prepolymers in adhesives, coating compounds, lacquers, etc. is known. These onecomponent systems harden through reaction of the NCO groups with atmospheric moisture, three-dimensional networks being built up. An alternative to this hardening principle is the addition of masked amines which do not react with the isocyanate groups in the absence of moisture, but which in the presence of moisture release amino groups which bring about the crosslinking reaction with the NCO groups.

The disadvantage of all moisture-hardening polyurethane systems is their tendency to form microcracks and bubbles through the release of carbon dioxide during hardening. This effect is regarded as troublesome in virtually every field of application. Although the formation of bubbles is avoided by addition of the masked hardeners mentioned above (ketimines, aldimines), these systems have serious deficiencies in regard to their storability. Even traces of moisture are sufficient to demask the amine, so that crosslinking occurs before the composition is applied. In addition, the adhesion of systems of this type to various substrates is often inadequate, so that in practice the surfaces have to be pretreated or rather primed.

DESCRIPTION OF THE INVENTION

Other than in the operating examples, or where otherwise indicated, all numbers expressing quantities of ingredients or reaction conditions used herein are to be understood as modified in all instances by the term "about".

An object of the present invention is to provide a process for the production of new prepolymers and sealing compounds, adhesives and coating compositions formulated therefrom which crosslink with moisture to form elastic materials free from fine cracks and bubbles and which show improved adhesion to various substrates. The invention seeks to eliminate the need to add masked hardeners while, at the same time, avoiding all the other above-mentioned disadvantages of the prior art.

According to the invention, this object is achieved by a process for the production of new isocyanate prepolymers showing improved hardening behavior which comprises two steps, namely:

a) initially reacting a polyether and/or polyester containing 2 hydroxyl groups and having a molecular weight (number average) of from 500 to 5000 with a low molecular weight diisocyanate in a molar ratio of from 1 : 0.7 to 1 : 1.3 until the content of free isocyanate groups in the resulting reaction product is between 0.4 and 0.8% by weight, and then b) allowing the reaction mixture to continue to react with simultaneous addition of a low molecular weight triol and the same or a different diisocyanate or a polyfunctional isocyanate with the quantities of such components adjusted to produce a prepolymer having between 1.5 and 3.5% by weight of isocyanate groups, based on the weight of prepolymer.

Accordingly, the present process adopted in accordance with the invention to achieve the object stated above essentially comprises a two-step synthesis of the isocyanate-containing prepolymer. A strictly linear preadduct is prepared in the first step. In the second step a so-called crosslinker polyol, i.e. a trifunctional polyol, which may optionally contain relatively small quantities of higher polyols, such as a tetrol, and more diisocyanate are added. In this second step, a further reaction takes place between the linear isocyanate-terminated preadduct already formed and more low molecular weight diisocyanate on the one hand and the triol responsible for three-dimensional crosslinking on the other hand. If the reaction components are reacted with one another simultaneously in a single reaction step, rather than by the two-step procedure of the invention, the isocyanate-terminated prepolymers obtained, although of course still accessible to a moisture-induced hardening reaction, do not show the favorable properties required. This can be observed in particular during processing to sealing adhesives. Thus, the tensile shear strength values obtained on such materials as concrete, wood, metals or rigid PVC, are far from satisfactory. Tear strength is also characterized by unfavorable results, in addition to which the formation of very small bubbles is observed during the crosslinking of these polymers.

In the first step of the two-step process of the invention, a polyether and/or polyester containing 2 hydroxyl groups is reacted with a diisocyanate in the molar ratio given above. The ratio of the polyether and/or polyester containing 2 hydroxyl groups and having a molecular weight of from 500 to 5000 preferably lies at a molar ratio of polyester and/or polyether to diisocyanate of from 1 : 0.9 to 1 : 1.2. It can be seen from these figures that it is possible to use both a sub-equivalent quantity and also an excess, based on the diisocyanate, of hydroxyl-terminated polyester and/or polyether. Where an excess of diisocyanate component is present, the percentage by weight of free isocyanate groups in the first reaction step should preferably be between 0.6 and 0.8%, whereas, if the diol component is present in excess the isocyanate content is preferably adjusted to between 0.4 and 0.6% by weight. When this content is reached, the first step of the two-step reaction is complete.

Starting materials for the production of the prepolymers are primarily polyethers of the type obtainable by addition to dihydric alcohols, such as ethylene glycol, propylene glycol, and 1,4-butanediol. The above diols are standard commercial diols which may advantageously be produced by polyaddition of propylene oxide. However, other olefin oxides may also be used for the production of these polydiols. Finally, corresponding 1,4-ethers of butanediol may be prepared by ring-opening polymerization of tetrahydrofuran. In addition to the polyethers, the esterification products of glycol, diethylene glycol, and 1,4-butanediol with dicarboxylic acids, such as adipic acid, sebacic acid, terephthalic acid, phthalic acid or their anhydrides and the like may be used in known manner for the production of suitable polyesters containing 2 hydroxyl groups. Polyesters such as these are also standard materials in practice and are known as starting materials for the production of isocyanate prepolymers.

Diisocyanates suitable for the process of the invention are the isomeric tolylene diisocyanates, particularly technical mixtures of the 2,4- and 2,6-isomer, diphenylmethane diisocyanate, 1,6-hexamethylene diisocyanate, naphthylene diisocyanate, xylylene diisocyanate, isophorone diisocyanate (2,4,4-trimethyl-1,6-diisocyanatohexane), and dimeric 2,4-tolylene diisocyanate.

In the practical application of the process of the invention, it is preferred to use catalysts which promote the isocyanate polyaddition reaction. Such catalysts are, for example, the known tin compounds, such as dibutyltin dilaurate, and tertiary amines, such as endoethylene piperazine. In the second reaction step, the prepolymer is partially branched. To this end, the same or another diisocyanate or a polyfunctional isocyanate in addition to the low molecular weight triol is reacted in such a ratio that the end product contains from 1.5 to 3.5% by weight of isocyanate groups. The course or rather the end of this reaction may be observed by monitoring the content of free isocyanate in the reaction mixture. Suitable triols are trimethylolpropane and adducts of propylene or ethylene oxide with trimethylolpropane, glycerol or other commercially obtainable trifunctional alcohols. It is also possible to replace up to about 25 mole % of the triol by a tetrol. This does of course produce greater branching which acts in various ways on the properties of the prepolymer and the polyurethane obtainable therefrom. The second reaction step can also be carried out using the same diisocyanates as used for the first step of the two-step process.

In a variation of the process of the invention, it is also possible, instead of using a triol, to use a mixture of a relatively short-chain diol and a triol, in which case the content of diol and triol may be reduced to a molar ratio of 1 : 1. In that case, however, a corresponding quantity of a polyfunctional isocyanate has to be used instead of a diisocyanate. For example, it is possible to use triisocyanates, such as triphenylmethane triisocyanate, the trimerization product of tolylenediisocyanate and the adduct of 3 moles of tolylenediisocyanate with 1 mole of trimethylolpropane.

After they have been hardened under the effect of the moisture in the atmosphere, the isocyanate-terminated prepolymers obtainable in accordance with the invention give crosslinked structures having reproducible, desired mesh widths. By contrast, in the synthesis of prepolymers from diols containing 2 hydroxyl groups and so-called branching polyols, i.e. essentially triols, and diisocyanates by a one-pot process, a more or less uniform distribution of the crosslinking points is obtained. It is only by adopting a two-step procedure that the crosslinking points are distributed as required over the prepolymer. Surprisingly, this two-step reaction alone leads to the advantages of a distinctly reduced or substantially no longer discernible tendency towards bubble formation during hardening of the prepolymers and, in addition, to improved adhesion to a variety of materials, such as metals, concrete and plastics.

NCO-terminated polyurethanes synthesized in this way may be used as principal component of compositions for adhesives and sealing compounds. Other components which may be used in such compositions are auxiliaries known to those skilled in this art, such as fillers (silica, chalk, carbon black, talcum, powdered plastics (swellable PVC powder), plasticizers, (for example dioctylphthalate, alkyl sulfonic acid esters, etc.), pigments in powder form or pigment pastes, flameproofing agents, antiagers and, optionally, other adhesion promoters.

In particular, solvents (for example xylene, toluene, etc.) may be used to adjust a desired viscosity, although they should be present in quantities of less than 20% by weight, based on the mixture as a whole.

These formulations show outstanding properties attributable to the special structure of the polyurethane in regard to bubblefree hardening, mechanical properties and adhesion to important substrates, such as for example iron, copper, aluminium, rigid PVC, concrete and meranti wood. This is clearly reflected in the comparative values obtained with prepolymers without bimodal network distribution. In many cases, the surfaces do not have to be pretreated with a primer, thus eliminating the need for this pretreatment step.

The invention will be illustrated but not limited by the following examples.

EXAMPLES

The following Examples illustrate the invention. The NCO values are given in % by weight. The following test procedures were used:

breaking elongation and tear strength: DIN 53504 (cross-head speed 200 mm/min.)

adhesion to various substrates: DIN 52455, part 1 (tensile strength) test specimens with joint dimensions of 50×15×15 mm cross-head speed: 26 mm/min.

viscosity: Brookfield at 22° C.

Preparation of the polyurethane prepolymers

EXAMPLE 1

665 g of polyoxypropylene glycol (molecular weight 2000, OH number 55) were initially introduced in an inert gas atmosphere, after which 0.13 g of benzoyl chloride and 0.36 g (0.05% by weight) of dibutyltin dilaurate were stirred in. 52.5 g of 2,4-tolylene diisocyanate were then added, followed by stirring for about 5 hours at 75° C. The NCO content was then 0.5%. 14.3 g of the adduct of glycerol and propylene oxide in a molar ratio of 1 : 6 were then added and 75 g of diphenylmethane diisocyanate added dropwise over a period of 15 minutes. The mixture was then stirred for 2 hours at 75° C.

| NCO content: | 2.25% |
|---|---|
| Viscosity: | 85,000 mPa.s |

EXAMPLE 2

The procedure was as in Example 1, except that in the first step 93.7 g of diphenylmethane diisocyanate were added to a mixture of 665 g of the polyoxypropylene glycol and 0.013 g of benzoyl chloride. An NCO value of 0.65% was measured after 7 hours. A mixture of 21.5 g of the adduct of glycerol and propylene oxide and 45.7 g of 2,4-tolylene diisocyanate and 0.4 g of dibutyl tin dilaurate, which had been allowed to react beforehand for 30 minutes at 60° C, was then added, followed by stirring for 1 hour at 75° C.

| NCO content: | 2.1% |
|---|---|
| Viscosity: | $1.1 \times 10^6$ mPa.s |

EXAMPLE 3

The first step of the reaction was carried out in the same way as in Example 2. 14.3 g of the adduct of glycerol and propylene oxide and 41.85 g of a mixture of 2,4- and 2,6-tolylene diisocyanate (molar ratio 65 : 35) and 0.4 g of dibutyltin dilaurate were then successively added, i.e. without a preliminary reaction. The mixture was then stirred for 1 hour at 75° C.

| | |
|---|---|
| NCO content: | 2.2% |
| Viscosity: | 800,000 mPa.s |

COMPARISON TESTS

A) 665 g of polyoxypropylene glycol (molecular weight 2000, OH number 55), 14.3 g of the adduct of glycerol and propylene oxide, 0.14 g of benzoyl chloride, 43.5 g of 2,4-tolylene diisocyanate, 81.25 g of diphenylmethane diisocyanate and 0.4 g of dibutyltin dilaurate were stirred for 2 hours at 75° C. in a one-pot reaction in an inert gas atmosphere.

| | |
|---|---|
| NCO content: | 2.0% |
| Viscosity: | 50,000 mPa.s |

B) 920.8 g of polyoxypropylene glycol (molecular weight 2000, OH number 55), 4.5 g of trimethylolpropane, 0.18 g of benzoyl chloride and 212.5 g of diphenylmethane diisocyanate were stirred for 6 hours at 75° C. in a one-pot reaction in an inert gas atmosphere.

| | |
|---|---|
| NCO content: | 2.6% |
| Viscosity: | 50,000 mPa.s |

Production of a sealing adhesive

EXAMPLE 4

250 g of the prepolymer of Example 1, 60 g of diisooctyl phthalate, 35 g of a finely disperse pyrogenic silica (particle size 150–200 μm, powder density 40 g/l) and 0.5 g of dibutyltin dilaurate were intensively mixed under nitrogen for 30 minutes at a temperature of 60° C. in a vacuum-type planetary dissolver, followed by deaeration with continued stirring for 30 minutes at 1.3 kPa.

EXAMPLES 5 and 6

Sealing adhesives 5 and 6 were prepared in the same way as described above for Example 4 using the prepolymers of Examples 2 and 3.

The properties of the sealing adhesives are shown in the following Table. Their tear strength (DIN 53 504) and breaking elongation are shown against the Example number and the prepolymer thus used. Their tensile strength (DIN 52 455) on various materials is also shown.

Table

| Example/ prepolymer | Tear strength (N/mm$^2$) | Breaking elongation (%) | Tensile strength (N/cm$^2$) | | | |
|---|---|---|---|---|---|---|
| | | | concrete | Al | rPVC | meranti wood |
| 4/1 | 2.1 | 1625 | 34 | 57 | >67 | >67 |
| 5/2 | 3.3 | 1800 | 34 | 44 | 64 | >67 |
| 6/3 | 5.2 | 1700 | 65 | 52 | 53 | >67 |
| Comp. A | 0.8 | 2300 | 13 | 7 | 6 | 16 |
| Comp. B | 1.2 | 2300 | 16 | 14 | 23 | 40 |

I claim:

1. A process for the preparation of isocyanate prepolymers comprising the steps of
    A. reacting a polyether and/or a polyester containing 2 hydroxyl groups and having a number average molecular weight of from about 500 to about 5000 with a diisocyanate in a molar ratio of from about 1 : 0.7 to about 1 : 1.3 until the content of free isocyanate groups in the resulting product is between about 0.4 and about 0.8% by weight; and
    B. adding to the reaction mixture in step A a low molecular weight triol and the same or a different diisocyanate or a polyfunctional isocyanate, with the quantities of such components adjusted to produce a prepolymer having between about 1.5 and about 3.5% by weight of isocyanate groups, based on the weight of the prepolymer.

2. The process of claim 1 wherein in step A said molar ratio is from about 1 : 0.9 to about 1 : 1.2.

3. The process of claim 1 wherein in step A the reaction is continued until the content of free isocyanate groups in the resulting product is between about 0.6 and about 0.8% by weight where the diisocyanate is used in excess, and between about 0.4 and about 0.6% where the diisocyanate is used in a subequivalent quantity.

4. The process of claim 1 wherein in step A a polyether is employed as a reactant which is an adduct of ethylene glycol, propylene glycol, or 1,4-butanediol with the polyaddition of propylene oxide.

5. The process of claim 1 wherein in step A a polyester is employed as a reactant which is an esterification product of glycol, diethylene glycol, or 1,4-butanediol with a dicarboxylic acid which is adipic acid, sebacic acid, terephthalic acid, phthalic acid, or an anhydride of any of the foregoing.

6. The process of claim 1 wherein in step A the diisocyanate is an isomeric tolylene diisocyanate, diphenylmethane diisocyanate, 1,6-hexamethylene diisocyanate, naphthylene diisocyanate, xylylene diisocyanate, isophorone diisocyanate or dimeric 2,4-tolylene diisocyanate.

7. The process of claim 1 wherein step A is carried out in the presence of a catalyst that promotes the reaction.

8. The process of claim 7 wherein the catalyst is an organic tin compound or a tertiary amine.

9. The process of claim 1 wherein in step B the low molecular weight triol is trimethylolpropane, an adduct of propylene or ethylene oxide with trimethylolpropane, or glycerol.

10. The process of claim 1 wherein in step B up to about 25 mole % of the triol is replaced by a tetrol.

11. The process of claim 1 wherein in step B a mixture of a diol and triol is employed in combination with a polyfunctional isocyanate.

12. The process of claim 11 wherein the polyfunctional isocyanate is triphenylmethane triisocyanate, the trimerization product of tolylenediisocyanate, or the adduct of 3 moles of tolylenediisocyanate with 1 mole of trimethylolpropane.

13. The isocyanate prepolymer produced by the process of claim 1.

14. The isocyanate prepolymer produced by the process of claim 2.

15. The isocyanate prepolymer produced by the process of claim 3.

16. In a composition useful as an adhesive, sealing compound, or coating composition, the improvement comprising the presence therein of the isocyanate prepolymer of claim 13.

17. In a composition useful as an adhesive, sealing compound, or coating composition, the improvement comprising the presence therein of the isocyanate prepolymer of claim 14.

18. In a composition useful as an adhesive, sealing compound, or coating composition, the improvement comprising the presence therein of the isocyanate prepolymer of claim 15.

* * * * *